United States Patent [19]

Yardley et al.

[11] 4,010,235

[45] Mar. 1, 1977

[54] MOULDED PLASTIC-RUBBER COMPOSITES

[75] Inventors: James Frank Yardley, Shenston near Lichfield; Allen Frederick Nightingale, Birmingham, both of England

[73] Assignee: Dunlop Limited, London, England

[22] Filed: Apr. 17, 1975

[21] Appl. No.: 569,318

Related U.S. Application Data

[62] Division of Ser. No. 303,782, Nov. 6, 1972, abandoned.

[30] Foreign Application Priority Data

Nov. 18, 1971 United Kingdom ............ 52555/71
Sept. 20, 1972 United Kingdom ............ 43526/72

[52] U.S. Cl. ................................ 264/241; 156/332; 260/879; 264/259; 264/265; 264/328; 264/329; 428/340
[51] Int. Cl.² ............................................ B29H 9/00
[58] Field of Search .......... 264/259, 241, 265, 328, 264/329, 261; 428/340, 515–517, 519; 260/80.78, 878, 897; 156/332

[56] References Cited

UNITED STATES PATENTS

| | | | |
|---|---|---|---|
| 2,665,521 | 1/1954 | Ford ................................ | 264/328 |
| 3,176,057 | 3/1965 | Peters et al. ...................... | 264/328 |
| 3,271,845 | 9/1966 | Breher .............................. | 264/328 |
| 3,287,485 | 11/1966 | McCord ............................ | 264/328 |
| 3,388,212 | 6/1968 | Nichols et al. .................... | 264/265 |
| 3,660,224 | 5/1972 | Cau et al. ......................... | 428/340 |

*Primary Examiner*—Jeffery R. Thurlow
*Attorney, Agent, or Firm*—Stevens, Davis, Miller & Mosher

[57] ABSTRACT

A method of producing a moulded plastic-rubber composite comprising injection or transfer moulding a thermoplastic high pressure polymerized ethylene polymer so that it is brought, in a molten state, into contact with a prevulcanized rubber component containing up to 55 per cent by volume of a rubbery olefin polymer.

The plastic-rubber composite produced by this method may be used in applications in which hitherto rubber-metal composites have been used, for example valve diaphragms, tire valve bodies, shock absorbers, engine mountings, vibration dampers, compression springs, torsion bushes, flexible drive couplings etc., of which the following is a specification.

7 Claims, No Drawings

MOULDED PLASTIC-RUBBER COMPOSITES

This is a division of application Ser. No. 303,782, filed Nov. 6, 1972, now abandoned.

This invention relates to moulded plastic-rubber composites and in particular polyolefin plastic-rubber composites moulded by injection or transfer techniques.

According to one aspect of the invention a moulded composite structure comprises at least one component made of a thermoplastic high pressure polymerized ethylene polymer fusion-bonded to at least one component made of a prevulcanized rubber composition containing up to 55 per cent by volume of a rubbery olefin polymer.

According to another aspect of the invention, a method of producing a moulded plastic-rubber composite comprises injection or transfer-moulding a thermoplastic high pressure polymerized ethylene polymer so that it is brought, in a molten state, into contact with a prevulcanized rubber composition containing up to 55 per cent by volume of a rubbery olefin polymer or polymer blend.

While adequate bonding is achieved using rubber compositions containing up to 55 per cent by volume of a rubbery olefin polymer or polymer blend it is preferred to use a rubber composition containing from 5 to 35 per cent by volume of a rubbery olefin polymer or polymer blend.

The rubbery olefin polymer may be saturated or unsaturated; rubbers that may be used include ethylene/propylene copolymers, containing from 20 to 85 mole per cent units derived from ethylene; ethylene/alpha-olefin/polyene terpolymers, containing from 20 to 85 mole per cent units derived from ethylene and from 0.1 to 10 mole per cent units derived from the polyene; or blends containing one or more of these with other rubbers, e.g. styrene-butadiene rubber, polybutadiene, polyisoprene etc. The polymer blend may contain from 20 to 100 per cent by weight of olefin polymer.

The main ingredients of the rubber composition in addition to the rubbery olefin polymer and other rubber (if present) are fillers and/or extending oils. These may be selected from any of those ingredients normally used in compounding olefin polymers. Other additives, such as vulcanizing ingredients, pigments etc., may also be included.

The thermoplastic high pressure polymerized ethylene polymers used in this invention preferably have melt indices or minimum flow rates of not less than 0.25. These melt indices or minimum flow rates are determined under test conditions, appropriate to the materials, which are specified in ASTM standard D 1238-65T.

These thermoplastic high pressure polymerized ethylene polymers may be homopolymers, i.e. low density polyethylene or crystalline copolymers of ethylene with vinyl alkanoic esters, e.g. vinyl acetate; alkyl acrylates, e.g. ethyl acrylate; or vinyl halides, e.g. vinyl chloride. These plastics materials may contain any of the additives (i.e. fillers, reinforcing agents, etc) normally added to such plastics materials.

This invention may be used in the manufacture of many articles which hitherto have been made as metal/rubber composites, for example valve diaphragms which have a rubber body with a plastic insert, tyre valve bodies, shock absorbers, engine mountings, vibration dampers, compression springs, torsion bushes, flexible drive couplings etc.

The invention will now be illustrated by the following Examples

EXAMPLE I

A rubber composition of the formulation given in Table I was vulcanized for 60 mins at 150° C in a mould measuring 8.0 mm × 76.2 mm × 228.6 mm. Slabs 50.8 mm square and 8.0 mm thick were cut from the sheet and were placed in turn in a mould 12.7 mm × 50.8 mm × 50.8 mm.

Low density polyethylene with a melt flow index of 7.0 (commercially available as ALKATHENE WNG 14) was injected into the mould at 250° C, the mould being at 50° C. The composite was allowed to cool, and on stripping the vulcanizate from the polyethylene, rubber failure occurred.

TABLE I

| | |
|---|---|
| EPDM (ROYALENE 502) | 100 |
| Speswhite clay | 150 |
| naphthenic oil | 50 |
| zinc oxide | 5 |
| sulphur | 2 |
| mercaptobenzthiazole | 1.5 |
| tetramethylthiuram disulphide | 0.75 |
| tellurium diethyl dithiocarbamate | 0.75 |
| dipentamethylenethiuram tetrasulphide | 0.75 |
| % volume of olefin polymer | 49.6 |

(Note: all values are parts by weight unless stated otherwise).

EXAMPLE II

Rubber compositions B and C of the formulations given below were vulcanized at 150° C for 60 mins in a mould measuring 4.0 mm × 76.2 mm × 228.6 mm. Slabs measuring 4.0 mm × 76.2 mm × 101.6 mm were cut from the sheet and placed in turn in a mould measuring 9.5 mm × 76.2 mm × 101.6 mm. An ethylene/vinyl acetate copolymer (commercially available as ALKATHENE A9840) containing 18 per cent by weight units derived from vinyl acetate was injected into the mould and maintained at a pressure of 94 MN/m$^2$ for 15 seconds.

The mould and nozzle of the injector were respectively at 50° C and 210° C at the commencement of the injection cycle. The composite was allowed to cool for 75 seconds.

TABLE II

| | B | C |
|---|---|---|
| EPDM (Royalene 502) | 100 | 100 |
| FEF carbon black | 20 | 200 |
| naphthenic oil | 20 | 200 |
| zinc oxide | 5 | 5 |
| sulphur | 2 | 2 |
| mercaptobenzthiazole | 1.5 | 1.5 |
| tetramethylthiuram disulphide | 0.75 | 0.75 |
| dipentamethylenethiuram tetrasulphide | 0.75 | 0.75 |

TABLE II-continued

|  | B | C |
|---|---|---|
| % volume of olefin polymer | 79.0 | 27.3 |
| adhesion to ethylene/vinyl acetate copolymer (%) | NONE | 100 |
|  |  | Rubber faiulre on stripping |

(Note: all values are parts by weight unless stated otherwise).

EXAMPLE III

Slabs of vulcanized rubber compositions B and C produced according to the formulations given in Example II were placed in the mould described in Example II. Low density polyethylene with a melt flow index of 7.0 (commercially available as ALKATHENE WNG14) was injected into the mould at 275° C, the mould being at 50° C. The composite was allowed to cool and, on stripping the vulcanizates from the polyethylene, the composite with composition B did not adhere but the composite with composition C gave rubber failure.

Having now described our invention, what we claim is:

1. A method of producing a bonded molded plastic-rubber composite comprising
   injection or transfer molding a thermoplastic, high pressure polymerized ethylene polymer having a melt index or minimum flow rate of not less than 0.25, when measured according to the test conditions specified in ASTM Standard D 1238-65T, so that it is brought, in a molten state, into contact with
   a prevulcanized rubber component containing from 5 to 55 per cent by volume of a rubbery olefin polymer selected from the group consisting of ethylene/propylene copolymers containing from 20 to 85 mole per cent units derived from ethylene, ethylene/alpha-olefin/diene terpolymers containing from 20 to 85 mole per cent units derived from ethylene and from 0.1 to 10 mole per cent units derived from the diene, and a blend containing one or more of these with up to 80 per cent by weight of at least one other rubber selected from the group consisting of styrenebutadiene rubber, polybutadiene, and polyisoprene, the remainder of the composition comprising ingredients normally used in compounding rubbery olefin polymers.

2. A method according to claim 1 in which the prevulcanized rubber component contains from 5 to 35 per cent of a rubbery olefin polymer.

3. A method according to claim 1 in which the rubber composition comprises in addition to the rubbery olefin polymer, one or more fillers and/or extending oils.

4. A method according to claim 1 in which the thermoplastic high pressure polymerized ethylene polymer is a low density polyethylene.

5. A method according to claim 1 in which the thermoplastic high pressure polymerized polymer is a crystalline copolymer of ethylene.

6. A method according to claim 5 in which the ethylene is copolymerized with a monomer selected from the group consisting of a vinyl alkanoic ester, an alkyl acrylate and a vinyl halide.

7. A method according to claim 5 in which the ethylene is copolymerized with a monomer selected from the group consisting of vinyl acetate, ethyl acrylate or vinyl chloride.

* * * * *